United States Patent [19]

Dobyns et al.

[11] Patent Number: 4,976,756
[45] Date of Patent: Dec. 11, 1990

[54] DUST COLLECTOR HOUSING WITH REMOVABLE ROOF SECTION

[75] Inventors: Loren K. Dobyns, Gillette; Gary S. Hanson; Durel B. Shrum, both of Wright, all of Wyo.

[73] Assignee: Atlantic Richfield Company, Los Angeles, Calif.

[21] Appl. No.: 464,801

[22] Filed: Jan. 16, 1990

[51] Int. Cl.$^5$ .................. B01D 46/02; B01D 46/04
[52] U.S. Cl. .................. 55/341.100; 55/302; 55/304; 55/361; 55/379; 55/480
[58] Field of Search .............. 55/302, 304, 341.1, 55/341.5, 361, 379, 478, 480, 481; 210/237

[56] References Cited

U.S. PATENT DOCUMENTS

| | | | |
|---|---|---|---|
| 3,141,845 | 7/1964 | Nadhenvy | 210/237 |
| 3,217,468 | 11/1965 | O'Dell | 55/349.1 X |
| 3,436,898 | 4/1966 | Kaess et al. | 55/481 X |
| 3,951,627 | 4/1976 | Barr et al. | 55/478 X |
| 4,158,554 | 6/1979 | Bundy et al. | 55/379 |
| 4,773,922 | 9/1988 | Ross et al. | 55/481 |

*Primary Examiner*—Charles Hart
*Attorney, Agent, or Firm*—Michael E. Martin

[57] ABSTRACT

A dust collector housing or baghouse is modified to provide for the removal of increased length filter bags and support cages by providing a removable roof section which is connected to the main housing section by cooperating inwardly projecting flanges formed on the upper transverse edge of the housing section and a lower depending side wall of the roof section. The flanges are accessible from the clean air plenum within the baghouse for insertion and removal of flange connecting bolt assemblies.

6 Claims, 1 Drawing Sheet

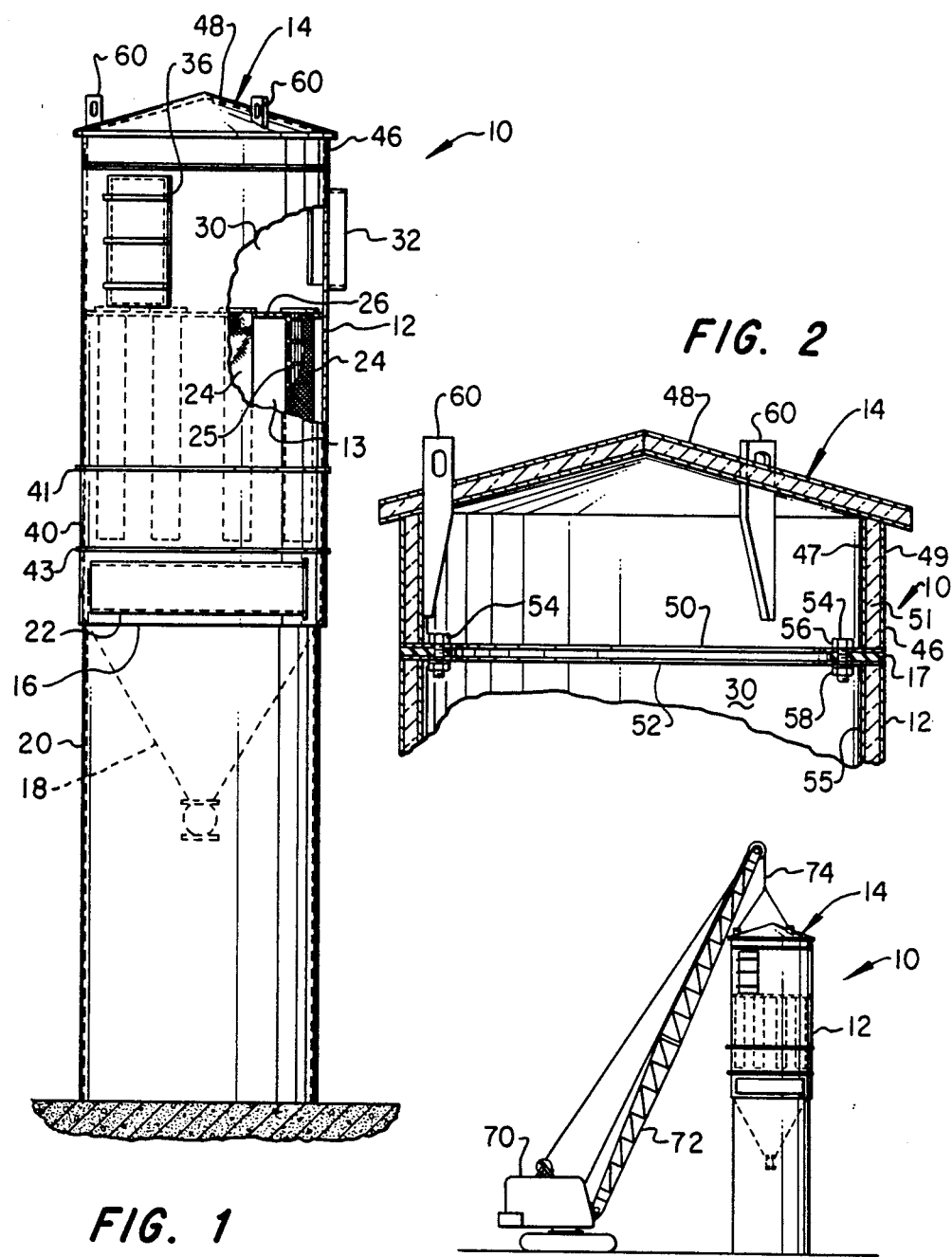

DUST COLLECTOR HOUSING WITH REMOVABLE ROOF SECTION

BACKGROUND OF THE INVENTION

1. Field of the Invention

The present invention pertains to a dust collector housing or so-called baghouse having a removable roof section which is accessed for attachment to and removal from the remainder of the housing from inside the clean air plenum.

2. Background

Certain types of air filtering systems utilize a housing in which are supported a plurality of cloth filter bags which are of a generally cylindrical tubular sock-like configuration and are each supported by a wire cage-like structure. Air flows through the filter bags from the outside surface to an interior space provided by the wire cage and then to a clean air plenum usually formed as a part of the housing above a support deck for the filter bags. Certain ones of these types of air filtering systems are relatively elaborate, large scale structures which are expensive to replace or modify when it is required to increase their filtering capacity.

However, when the need arises to increase the air filtering capacity of this type of filter one technique is to modify the housing, commonly called a "baghouse", to provide for lengthening the filter bags and their support cages. Since the filter bags and their support cages are usually removed for servicing or replacement through the clean air plenum a problem arises in modifying the bag and its support cage or similar structure to be removed into the plenum due to the increased bag length. These baghouses sometimes stand on the order of 50 or 60 feet high and the provision of means for removing the filter bags and their supporting cages, when modified by merely lengthening the bag the cage is not easily accomplished. However, in accordance with the present invention there is provided an improved filter bag support housing as described herein.

SUMMARY OF THE INVENTION

The present invention provides an improved dust collector housing of the type typically utilizing elongated dust collection bags which require to be removed from a support deck within the housing through a clean air plenum. In accordance with an important aspect of the present invention there is provided a dust collector housing generally of the aforementioned type which has a removable roof section which is supported on and connected to a main part of the housing by matching internal flanges and by flange fastening means which are accessible from the interior, clean air plenum portion of the housing.

In accordance with another aspect of the present invention there is provided an improved dust collector housing having a removable roof section which is adapted to be connected to and disconnected from the remainder of the housing by cooperating flanges which are accessible for securing the roof section to the housing from inside the housing, and which roof section is provided with means for lifting the roof section clear of the housing so that the dust collection or filter elements may be inserted in and removed from the housing through the clean air plenum.

The present invention further provides a unique method for modifying a dust collector housing or so-called baghouse to provide dust collector or filter elements of increased length and capacity and which require to be removed from the housing through an upper portion thereof and wherein the modification method includes the steps of removing an existing roof section, providing internal flanges on the roof section and the portion of the housing from which the roof section has been removed, replacing the roof section and securing the roof section to the housing with fasteners from within a clean interior part of the housing.

Those skilled in the art will recognize the aforementioned advantages and superior features of the present invention together with other favorable aspects thereof upon reading the detailed description which follows in conjunction with the drawing.

BRIEF DESCRIPTION OF THE DRAWING

FIG. 1 is an elevation of an improved dust collector or baghouse in accordance with the present invention;

FIG. 2 is a central section view of the upper portion of the baghouse illustrated in FIG. 1; and FIG. 3 is a view illustrating one preferred method for removing the roof section of the baghouse.

DESCRIPTION OF A PREFERRED EMBODIMENT

In the description which follows like parts are marked throughout the specification and drawing with the same reference numerals, respectively. The drawing figures are not necessarily to scale and certain features may be shown in simplified form in the interest of clarity and conciseness.

Referring to Figure there is shown an air filter or dust collector housing, sometimes commonly known as a baghouse, generally designated by the numeral 10. The baghouse 10 is typically characterized as a generally cylindrical structure having a main housing portion 12, a roof section 14, a dust laden air inlet section 16 and a dust collection and discharge hopper 18. The aforementioned structural components may, as illustrated, be supported above ground on a substructure 20. Dust-laden air is admitted to the housing 12 through an inlet duct 22 from a source, not shown, and flows into the housing 12 and through dust collector elements 24 which are supported in depending fashion from an interior transverse deck 26.

The dust collector elements 24 are typically characterized by long cloth, tubular sock-like bags which are supported from the deck 26 on the exterior of wire cages 25, one shown, which extend substantially the length of the bags 24 to assist in holding the bags in a generally tubular shape. Dust laden air entering the interior chamber 13 of the housing 12 flows through the bags or filter elements 24 and into a clean air plenum 30 above the deck 26. Clean air exits the plenum 30 through a discharge duct 32. Dust collects on the exterior surface of the elements 24 and, typically, is periodically removed by mechanically shaking the elements or by causing a pulse of pressure air to flow in reverse direction therethrough. The filter elements 24 are preferably removed from the deck 26 for cleaning or replacement by lifting the elements up into the clean air plenum 30 which is accessible through a door or hatch 36 disposed in a side wall of the housing 12.

Typically the filter elements 24 and their support cages 25 are of a length such that they may be removed from the baghouse 10 through the clean air plenum 30 and a doorway which is covered by the door 36. Suitable equipment, not shown, is usually provided on the exterior of the baghouse 10 for providing access by operating personnel through the door 36 into the clean air plenum during shutdown of the dust collection system for servicing the filter elements 24.

The baghouse 10 may be a relatively substantial structure. For example, a typical dust collection or filter system employing cloth bag type filters in a so-called baghouse type structure may be on the order of fourteen feet in diameter and have an overall height of fifty feet, considering the envelope dimensions of the structure illustrated in FIG. 1. If it becomes necessary to increase the filtering capacity of the elements 24, modification of the baghouse 10 is not an inconsequential exercise and the cost of replacing the baghouse with a larger capacity house may be prohibitive. However, in accordance with certain aspects of the present invention a conventional baghouse having a generally cylindrical housing 12 may be modified to increase the length or "height" of the housing and thus accommodate longer filter elements 24 by interposing a generally cylindrical spacer section 40 between the original housing 12 and the air inlet section 16. The spacer section 40 may be joined to the original housing section 12 and the air inlet section 16 by cooperating externally projecting matching flanges 41 and 43 on the respective sections which are provided with aligned fastener receiving holes, not shown, and thus the housing section 12 may be suitably secured to the new spacer section 40 and the spacer section 40, in turn, secured to the supporting structure of the baghouse including the inlet air section 16. This modification is typically a one-time event and may be carried out using suitable hoisting equipment and/or support scaffolding around the exterior of the baghouse 10, for example.

However, modification of the dust collector apparatus of the type aforementioned to accommodate filter elements or dust collector bags of increased length presents a problem with regard to removal of the supporting wire cage structures for these elements through the clean air plenum 30. In accordance with the present invention the baghouse 10 is provided with a removable roof section 14 having a generally cylindrical, relatively short, depending sidewall 46, see FIG. 2, also, and a generally conical roof 48 suitably joined thereto. The roof 48, sidewall 46 and the wall of the housing 12 may be of conventional construction, that is, single thickness plate or, as shown, inner and outer steel walls 47 and 49 having suitable insulation 51 interposed therebetween. In order to provide for removal of the lengthened filter elements 24 and their respective support cages 25 though the clean air plenum 30 the roof section 14 is constructed to be separable from the housing 12 and connected thereto by respective inwardly projecting flanges secured to the depending side wall 46 of the roof section 14 and an upper transverse edge 17 of the housing section 12.

Referring further to FIG. 2, the respective flanges are generally designated by the numerals 50 and 52. The flanges 50 and 52 are provided with spaced apart fastener receiving holes for receiving plural spaced apart fasteners 54 which may comprise conventional bolt and nut assemblies including a bolt 56 and a removable threaded nut 58. If the housing section 12 is cylindrical then, of course, the roof section 14 has a cylindrical depending side wall 46 and the flanges 50 and 52 are formed as generally cylindrical inwardly projecting rings. These flanges may be provided segmented or split to facilitate ease of handling before they are connected to the respective walls of the roof section 14 and the housing 12. The flanges 50 and 52 may be attached to the wall 46 and the housing 12 by welding the flanges to the inner and outer steel plate or cladding 47 and 49, and the corresponding inner and outer wall plates of the housing section 12, respectively. As shown also in FIGS. 1 and 2, the roof section 14 is modified, or provided during initial construction, with plural spaced apart lifting eye members 60 which are suitably secured to the inside plate 47 of the wall 46 and project through the roof portion 48. A total of three, circumferentially spaced lifting eyes 60 will provide for stable lifting by a suitable bridle or the like connected to a crane or other lifting device.

Thanks to the modified baghouse 10 which may be originally constructed as described, or modified from an existing baghouse without a removable roof section, the filtering capacity of the dust collection apparatus may be increased without substantial modification by lengthening the filter elements 24 and their respective wire cages 25 and which cages may be constructed in one piece. Thus, the cages 25 may be removed through the plenum 30 by first removing the roof section 14 so that easy access to and removal of the filter elements may be obtained. Since access to the clean air plenum 30 is provided by the door 36, a worker may enter the clean air plenum 30 without exposure to dust or other toxic material that has been separated from air in the filter apparatus 10, remove the bolt assemblies 54 from the interior of the clean air plenum 30 without requiring work to be carried out on the exterior of the structure at a high elevation, and then provide for removal of roof section 14 by suitable hoisting or lifting apparatus. As shown in FIG. 2 a suitable resilient gasket 55 is interposed between the flanges 50 and 52. Similar gaskets may be interposed between the flanges 41 and 43 which provide for joining the section 40 to the adjoining portions of the baghouse 10. Alternatively, of course, the baghouse 10 could be constructed initially as illustrated without the spacer section 40 and then modified to increase its capacity by adding the spacer section 40 and a set of longer, high capacity filter elements and supporting cages.

FIG. 3 illustrates one preferred method of removing and/or replacing the roof section 14 with respect to the housing 12. A suitable crane or similar hoisting apparatus 70 having a boom 72 and associated hoisting cable 74 may be rigged to lift the roof section 14 from the remainder of the baghouse 10 after it has been unfastened from the housing 12. Access to the roof 48 for rigging the cable 74 to the lifting eyes 60 may be provided by suitable ladders, not shown. By moving the roof section 14 away from above the clean air plenum, easy access to the filter elements 24 may be obtained for removing the elements upward from the deck 26 through the clean air plenum 30 and out of the housing 12 for repair or replacement.

When it is desired to replace the roof section 14 a person enters the clean air plenum through the door 36 and may stand on the deck 26 while the roof section 14 is lowered into position whereupon the roof section is reconnected to the housing 12 by inserting the bolts 56 through the suitable aligned receiving openings in the flanges 50 and 52 and the bolt assemblies are then made up.

Although a preferred embodiment of the present invention has been described herein those skilled in the art will recognize that other modifications and substitutions may be made to the specific embodiment described without departing from the scope and spirit of the invention as recited in the appended claims.

What is claimed is:

1. A dust collector apparatus including a baghouse having a housing section defining an interior space delimited by a deck, a plurality of filter elements disposed within said interior space and supported in depending fashion from said deck, said interior space forming between said deck and a roof section of said apparatus a clean air plenum;

a removable roof section delimiting the upper end of said clean air plenum, said roof section being adapted to be connected to and disconnected from said housing section by means accessible from within said clean air plenum; and means for accessing said clean air plenum for disconnecting said roof section from said housing section so that said roof section may be removed from said housing section to permit removal of said filter elements from said deck.

2. The apparatus set forth in claim 1 including:

lifting means connected to said roof section for lifting said roof section off of said housing.

3. The apparatus set forth in claim 1 wherein:

said means accessible from within said clean air plenum comprises spaced apart cooperable flanges connected to side walls of said roof section and said housing, respectively and projecting generally inwardly into said clean air plenum;

4. The apparatus set forth in claim 3 wherein:

said baghouse is generally cylindrical and said roof section includes a depending cylindrical wall having one of said flanges secured thereto and cooperable with the other of said flanges, the other of said flanges being secured to said housing section, and said apparatus includes fastener means for securing one of said flanges to the other.

5. A dust collector apparatus including a generally cylindrical baghouse having a housing section defining an interior space delimited by a deck, a plurality of filter elements disposed within said interior space and supported in depending fashion from said deck, said interior space forming between said deck and a roof section of said apparatus a clean air plenum;

a removable roof section delimiting the upper end of said clean air plenum, said roof section including a depending cylindrical wall adapted to be connected to and disconnected from said housing section by means accessible from within said clean air plenum comprising spaced apart cooperable flanges connected to said roof section and said housing, respectively and projecting generally inwardly into said clean air plenum;

fastener means for securing one of said flanges to the other;

lifting means connected to said roof section for lifting said roof section off of said housing section; and means for accessing said clean air plenum for disconnecting said roof section from said housing section so that said roof section may be removed from said housing section to permit removal of said filter elements from said deck through said clean air plenum.

6. A method of modifying a dust collector apparatus to increase the dust collecting and air handling capacity of said apparatus, said apparatus having a first housing section, a roof section and a plurality of generally elongated tubular dust collecting elements disposed in said first housing section and suspended from a generally horizontal deck formed in the interior of said first housing section and dividing said first housing section into an interior chamber for receiving dust laden air and a clean air plenum, said method including the steps of:

increasing the overall height of said apparatus by detaching said first housing section from a support structure therefor and inserting a second housing section between said first housing section and said support structure;

installing filter elements of increased capacity within said first housing section and suspended from said deck;

securing a generally radially inwardly projecting flange across an upper transverse edge of said first housing section;

securing a generally radially inwardly projecting flange to said roof section;

placing said roof section on said first housing section; and connecting said roof section to said first housing section by securing said flanges to each other from within said clean air plenum.

* * * * *